Figures 1, 2:
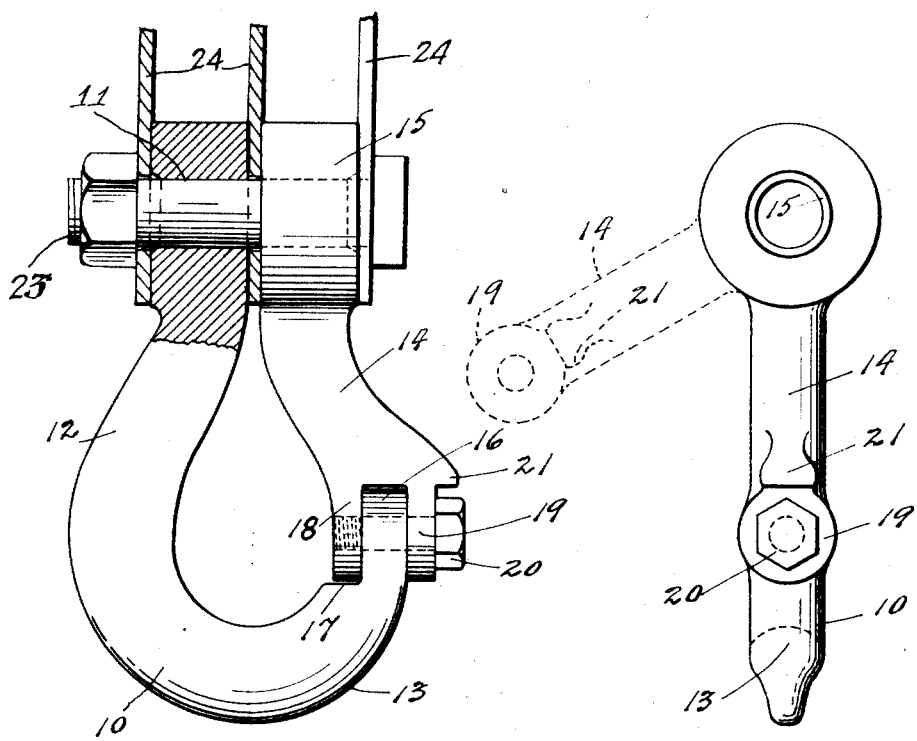

Feb. 12, 1929.

W. H. McKISSICK

BECKET

Filed Aug. 2, 1927

1,702,218

Inventor
W. H. McKissick

Jack A. Ehley
Attorney

Patented Feb. 12, 1929.

1,702,218

UNITED STATES PATENT OFFICE.

WILLIAM H. McKISSICK, OF TULSA, OKLAHOMA.

BECKET.

Application filed August 2, 1927. Serial No. 210,097.

This invention relates to new and useful improvements in beckets for pulley blocks and the like.

One object of the invention is to provide a becket with a hinged keeper which may be swung to open the becket so that a hook or other connection may be engaged therein without removing the becket from the block.

A further object of the invention is to provide a becket in which the connection inserted therein is held against displacement therefrom, thus making for safety.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a front view, partly in elevation and partly in section, of a becket constructed in accordance with the invention and closed, and Fig. 2 is a side elevation of the same with the support omitted, showing the becket closed in full lines and open in dotted lines.

In the drawings the numeral 10 designates a hook member comprising a circular eye 11 at its upper end, a downwardly and outwardly curved shank 12 and an upwardly curved bill 13.

A keeper member 14 comprises a circular eye 15 at its upper end complementary to and spaced from the eye 11. The body of the keeper is curved downwardly and outwardly. The hook member 10 and the keeper member 14 have a general U-shape.

The bill 13 of the hook is provided with a reduced lug 16 and an offset 17. The keeper has a pair of depending ears 18 and 19, respectively, straddling the lug. The ear 18 fits in the offset 17 so that said ear is prevented from protruding into the inner opening of the becket.

The outer ear 19 overhangs the lug and a machine screw 20 passed through the ear 19 and lug 16 is threaded into the ear 18. A boss 21 on the keeper overhangs the head of the screw, thus protecting the same and shunting objects from the head which might otherwise hang thereon.

When the becket is used, its eyes 11 and 15 are mounted to swing on a bolt or other support 23 carried by plates 24 and the becket thus suspended, as from the bottom of a pulley block. If it is desired to engage the eye or ring of a hook or other connection in the becket, the screw 20 is removed and the keeper 14 is swung to one side as is shown in dotted lines in Fig. 2. This opens the becket. When the keeper is returned and the screw replaced, the becket is closed and the object fastened therein is secured in a safe manner.

Various changes in the size and shape of the different parts, as well as modifications and alterations, may be made within the scope of the appended claims.

What I claim, is:

1. A safety becket comprising a curved hook member having a curved bill, a lug at the upper end of the bill, a curved keeper having spaced ears at its lower end straddling the lug, a fastening engaging in the ears and lug, pivoting means at the upper ends of the hook member and keeper for pivotally suspending the hook member and keeper, the bill having an offset for receiving the inner ear, and a boss on the keeper overhanging the fastening.

2. A safety becket comprising a curved hook member having a bill, a lug at the upper end of the bill, a curved keeper member having ears at its lower end straddling the lug and engaging the inner and outer faces thereof, a fastening connecting the ears and lug, and a pivot pin, the upper ends of the hook member and keeper having eyes for receiving the pivot pin, for pivotally suspending the hook member and keeper.

3. A safety becket comprising a hook member having a bill, a keeper member having its free end overlapping one face of the bill, means normally connecting the ends of the keeper member and the bill together, said means being removable from the ends to free the same, and a pivot pin, the upper ends of the hook member and keeper having eyes for receiving the pivot pin, for pivotally suspending the hook member and keeper.

4. A safety becket comprising a hook member having a bill, a keeper member having its free end overlapping one face of the bill, means normally connecting the ends of the keeper member and the bill together, said means being removable from the ends to free the same, and pivoting means at the upper ends of the hook member and keeper member for pivotally suspending the latter from the former.

In testimony whereof I affix my signature.

WILLIAM H. McKISSICK.